(12) United States Patent
Adjeleian

(10) Patent No.: US 6,596,374 B1
(45) Date of Patent: Jul. 22, 2003

(54) DEVICE FOR SECURING OBJECTS

(75) Inventor: Michael John Adjeleian, Ottawa (CA)

(73) Assignee: 3849953 Canada Inc., Ottawa (CA)

( * ) Notice: Subject to any disclaimer, the term of this patent is extended or adjusted under 35 U.S.C. 154(b) by 0 days.

(21) Appl. No.: 09/536,835

(22) Filed: Mar. 27, 2000

(30) Foreign Application Priority Data

Mar. 26, 1999 (CA) .............................................. 2267022

(51) Int. Cl.⁷ .............................. B32B 3/24; B65D 19/00
(52) U.S. Cl. .................... 428/131; 428/99; 248/346.11; 248/362; 248/205.5; 248/205.6; 248/205.7; 248/205.8; 206/490; 220/737
(58) Field of Search ................... 428/131, 99; 206/490; 248/346.11, 362, 205.5, 205.6, 205.7, 205.8; 220/737

(56) References Cited

U.S. PATENT DOCUMENTS

| | | | |
|---|---|---|---|
| 1,753,611 A | 4/1930 | Lower | |
| 2,083,299 A | 6/1937 | Hunter | |
| 2,565,793 A | * 8/1951 | Weismantel | ................ 248/363 |
| 2,908,473 A | 10/1959 | Snyder | |
| 3,847,324 A | 11/1974 | Uchanski et al. | ............. 229/1.5 |
| 4,040,549 A | 8/1977 | Sadler | ........................ 224/29 |
| 4,137,356 A | 1/1979 | Shoemaker et al. | ........ 428/211 |
| 4,759,525 A | 7/1988 | Cross et al. | ............. 248/346.1 |
| 4,760,987 A | 8/1988 | Lan | ......................... 248/346.1 |
| 4,836,488 A | 6/1989 | Ross | ......................... 348/346.1 |
| 4,955,493 A | 9/1990 | Touzani | |
| 4,978,566 A | 12/1990 | Scheurer et al. | ............. 428/157 |
| 5,133,524 A | 7/1992 | Liu | ......................... 248/205.8 |
| 5,180,132 A | 1/1993 | Pearson et al. | ............. 248/362 |
| 5,192,043 A | 3/1993 | Fa | ............................ 248/206.2 |
| 5,273,182 A | 12/1993 | Laybourne | .................. 220/740 |
| D357,170 S | 4/1995 | Wellsfry | ...................... D8/349 |
| 5,413,302 A | 5/1995 | Ferster | .................... 248/346.1 |
| 5,511,752 A | 4/1996 | Trethewey | ............... 248/205.9 |
| 5,742,971 A | 4/1998 | Salinger | .................... 15/167.1 |

FOREIGN PATENT DOCUMENTS

| DE | 37 42 636 | 1/1989 | ............ B60N/3/10 |
|---|---|---|---|
| WO | WO 91/06445 | 5/1991 | ............ B60N/3/10 |

* cited by examiner

Primary Examiner—William P. Watkins, III
(74) Attorney, Agent, or Firm—Fish & Richardson P.C.

(57) ABSTRACT

This invention provides a device for removably securing a wide variety of objects to different surfaces utilizing a partial vacuum. The device includes flexible material comprising one or more opening(s), wherein each opening is capable of forming a continuous seal with a portion of an object and the remaining material is capable of forming a continuous seal with a surface. The size of the opening and the size of the material can vary within the constraints that adequate material remains surrounding the opening to enable a continuous seal to be formed with a surface when an object is inserted into the opening. The device is used by inserting an object into an opening, thereby forming a continuous seal between the object and the opening and pressing the device against a surface, displacing air to create a partial vacuum in a manner that causes a continuous seal to form between the flexible material and the attachment surface, thereby removably securing the object to the surface.

23 Claims, 5 Drawing Sheets

DEVICE FOR SECURING OBJECTS

FIELD OF INVENTION

This invention relates to a device for securing one or a plurality of objects to a variety of surfaces.

BACKGROUND OF THE INVENTION

It is often desirable to secure open beverage containers to a moving surface, such as a deck, dashboard, or table in a boat or recreational vehicle. While it is desirable to prevent sliding and tipping of the container due to acceleration, i.e. changes in the speed, orientation or direction of the vehicle, it is of course desirable to have the ability to lift the container for the purpose of drinking or pouring from it. Previously, various attempts have been made to design devices that would accomplish these somewhat contradictory purposes.

It is known to coat the bottoms of beverage containers with a non-slip material to reduce slippage. However, this significantly increases the cost of manufacture of the container and, in addition, does not address the problem of tipping. In fact, such an arrangement actually increases the tendency of the container to overturn because a sheer force acting on the container at its center of mass (which is located above its support surface) will cause a rotational moment about the non-slip interface. U.S. Pat. Nos. 5,413,302, 5,273,182, 4,836,488, 4,137,356, 3,847,324, 4,978,566, and 4,040,549 disclose various slip resistant coasters and cup holders. A separate coaster or cup holder having a non-slip material reduces the cost of the container, but does not address the other limitations mentioned above.

Insulated beverage holder "sleeves" have also been used to reduce slippage of beverage containers on movable surfaces. Such a beverage holder is usually constructed of polystyrene and is configured to essentially surround the container. Such a device may have a non-slip surface to decrease the likelihood of slippage. In addition, a base of increased diameter may serve to somewhat increase the stability of the container against tipping. However, because there is necessarily a thickness associated with the base portion, such a device serves to raise the center of gravity of the container to attendantly increase the likelihood of spillage.

A wide variety of devices, referred to as suction cups, or suction devices, have been, disclosed that secure objects by utilizing a partial vacuum formed between the device and the attachment surface. In one form or another, such suction devices generally rely on having a non-porous flexible lip fully seated on a non-porous surface to create a partial vacuum thereby suctionally adhering the device, with an attached object, to a surface. Objects are attached, either permanently or temporarily, to the suction device, which is attached, either permanently or temporarily, to a surface. In other examples the order of attachment is reversed. The attachment between the object and the suction device is described as being attached □ to □ or □ on □ the object or suction device, rather than "through" or "in" the suction device.

Recently, it has been known to utilize a suction device to secure a beverage container to a surface. Such a device is disclosed in U.S. Pat. No. 4,795,525 issued to Cross et al. The holding device disclosed therein consists essentially of an initially flat, flexible disc secured to the concave bottom of an aluminum beverage can. The diameter of the disc is larger than that of the can. The disk is deformed into a concave shape in conformance with the bottom surface of the can. When placed upon a table or the like, the weight of the can sets a suction or vacuum chamber created by the convex shape of the disk and its flexible edges that protrude from the peripheral edges of the can. The non-slip characteristics of the disk minimize slippage of the can. In addition, the protruding edges of the disk add stability to the can.

However, the device disclosed in U.S. Pat. No. 4,759,525 has several limitations. In particular, this device is only suitable for use with a container having a concave bottom. In addition, since the suction chamber has a relatively large volume the device requires a significant displacement due to the weight of the can in order to set the suction. By the same token, it is difficult to break the seal thereof. In order to overcome this, a vent hole or passage may be provided to eliminate the sealing effect and thus the suction holding ability of the device. The vented Cross device can then be lifted without any manipulation of the coaster. Such a devise is disclosed in U.S. Pat. No. 5,180,132, however, this devise comprises an article holder which is only suitable for attachment of an object with an appropriate size and shape.

U.S. Des. Pat. No. 357,170 discloses a double-sided suction cup for dinnerware, which has a downwardly concave body that apparently functions by securing to an attaching surface and an upwardly concave body that attaches to a dinner plate such that, by imposing downward pressure, there forms between the dinner plate and the attaching surface a vacuum chamber. Another suction device is disclosed in U.S. Pat. No. 5,192,043, which teaches a magnetic rubber suction disc used for detachably securing an alarming device to a metal surface. This device, however, does not interact well with other objects as it is permanently affixed to the alarming device; furthermore, it is apparently unsuitable for attachment to plastic, drywall, wood, ceramics, and other non-metallic surfaces. In these examples, the suction device increases the distance between the bottom of the object and the top of the attaching surface, thus decreasing stability.

Further suction devices are known, with various improvements, such as those disclosed in U.S. Pat. Nos. 4,760,987, 5,511,752, 5,133,524 and 5,742,971, however, no single device is yet known to have universal utility. Specifically, these suction devices remain generally unsuitable as they are designed to produce only one or more of the following effects or features: double-suction; enhanced release; device specific; surface specific; or enhanced suction. The prior art does not provide for positioning the object in or through the device, which would facilitate improved stability. The secured object in the prior art is either permanently mounted to the top of the suction device, or is temporarily secured by a hook, hanger, or clasp either permanently or temporarily attached to the top of the suction device.

In addition, the prior art usually secures the object using a relatively small area of attachment per suction device. The area of attachment to the object is usually small in relation to the size of the object which has the effect of reducing stability. There are no internal design features that ensure some measure of proportionality between the size of the object, the area of the object attachment point, and the area of attachment to the surface.

There remains a need, therefore, for a suction device that can interact with a variety of objects for the purpose of temporary attachment to a variety of surfaces, and that allows an object to be inserted in and through the device. There is also a need for a suction device with an expanded attachment area for interaction with both an object and with the surface, to provide increased stability. Ideally, the design should exhibit a measure of proportionality between the size of the object, the area of the object attachment, and the area of attachment to the surface, an internal feature of that design would make significant contributions to the stability of the attachment.

In light of the foregoing, it is thus an object of the present invention to provide a device for securing objects that overcomes some of the deficiencies of the prior art devices.

This background information is provided for the purpose of making known information believed by the applicant to be of possible relevance to the present invention. No admission is necessarily intended, nor should be construed, that any of the preceding information constitutes prior art against the present invention. Publications referred to throughout the specification are hereby incorporated by reference in their entireties in this application.

SUMMARY OF THE INVENTION

An object of the present invention is to provide a device for removably securing objects. In accordance with an aspect of the present invention there is provided a device for removably securing objects comprising: (a) flexible material; (b) one or more opening(s) in said material, whereby said opening is capable of forming a continuous seal with a portion of an object, said flexible material is able to form a continuous seal with a surface capable of forming a partial vacuum, and said opening is positioned within the boundaries of said material whereby sufficient material remains surrounding said opening to enable a continuous seal to be formed with said surface when:

(1) an object is inserted into said opening forming a seal between the object and the opening and (2) said device is pressed against said surface in a manner that causes a continuous seal to form between the flexible material and said surface, in a manner that displaces air to create a partial vacuum, thereby removably securing said object to said surface.

DETAILED DESCRIPTION OF THE INVENTION

Figure 1:
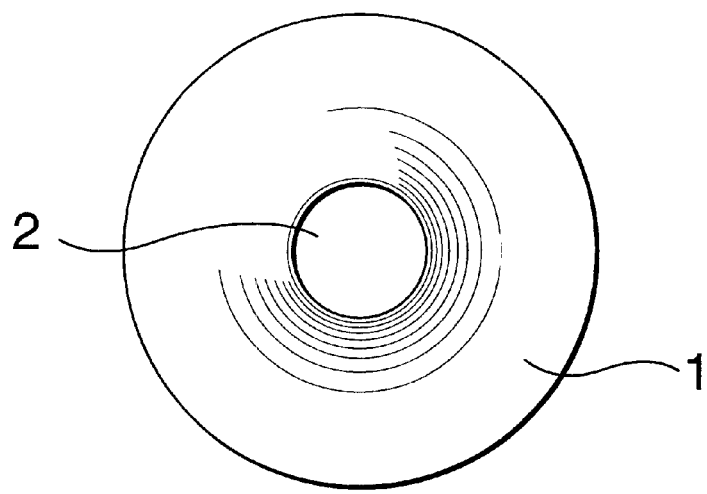
FIG. 1 illustrates a vertical frontal view of one embodiment of the device 1, with a centrally located object-opening 2.

Definitions and Terms:

The term, object-opening, means the aperture through which the object to be secured is inserted. The shape of the aperture can be circular, a plurality of insertion slits, or any other shape wherein the object is resiliently gripped with the formation of a continuous seal between the device and the object, enabling a vacuum to be generated when the device is pressed to a surface.

The term, object, means any container, such as bottles, cans, pots, boxes, tanks, gas cylinders, etc; or any items, such as flashlights, machinery, tools, etc which are required to be secured to a surface. It is important to stress that there is virtually no limitation as to what can constitute an object, as this device can be adapted to various sizes and shapes, within the constraints of the size and center of gravity of the object, the environmental constraints, the physics for formation and retention of the vacuum, etc. One skilled in the art would be able to determine whether the device is appropriate for use to reversibly secure an object to a surface under the conditions and for the time period required.

The term, surface, means any surface with which a vacuum can be created with the device. In a preferred embodiment, the surface is non-porous, such as table tops, windows, railings, walls, floors, dash boards, shelves, boxes, etc. Depending on the object and the device, the surface can be any orientation, i.e. not just horizontal or vertical, such that the object may be secured in the horizontal, the vertical, the inverted position or any intermediate position thereof. The surface may be curved, such the dashboard of a vehicle, the limitation being that the device is able to form and retain a vacuum with the surface.

The term, vacuum, means a negative pressure sufficient to reversibly secure an object to a surface for a required period of time.

This invention provides a device for removably securing a wide variety of objects to different surfaces utilizing a partial vacuum. The device includes flexible material comprising one or more opening(s), wherein each opening is capable of forming a continuous seal with a portion of an object and the remaining material is capable of forming a continuous seal with a surface. The size of the opening and the size of the material can vary within the constraints that adequate material remains surrounding the opening to enable a continuous seal to be formed with a surface when an object is inserted into the opening. The device is used by inserting an object into an object opening forming a continuous seal between the object and the opening and then pressing the device against a surface, displacing air to create a partial vacuum in a manner that causes a continuous seal to form between the flexible material and the attachment surface, thereby removably securing the object to the surface.

The invention is hereinafter described with reference to the Figures.

Size and Shape of the Device

The design of a device of this invention is extra-ordinarily flexible allowing for a wide degree of variation in manufacturing, marketing and functional applications. In particular, the design of the device, the material and the opening(s) are amenable to be fashioned with a wide variety of functional or decorative shapes, as demonstrated by way of example with FIGS. 1–11.

The simplest preferred embodiment, presented in FIG. 1, demonstrates the key criteria that must be present in each embodiment of the invention to enable the functional use of the device: the ability for an object to be inserted into one or more object-openings and the remaining material pressed against a surface in a manner that reversibly anchors or attaches the object to the surface.

One preferred embodiment of the present invention comprises a device in the shape of a ring fabricated in a flexible material, such as neoprene as demonstrated in FIG. 1. This embodiment of the device 1 is annular, with an object-opening 2 that is centrally positioned and circular in shape. The opening can be of variable size and the overall shape can be variable in size, but optimized so as to interact with a variety of objects (for example, see FIGS. 3 and 4) with different functional requirements.

In operation, an object is inserted into the object-opening 2 of the device 1 to create a flexible lip at the bottom end of the object that, when pressed against a surface, forms a vacuum in the resulting space and effectively attaches the object to the surface. Because of the high flexibility of the material of the device, it will conform to the surface and create a sealed suction chamber, or vacuum, thus automatically adhering to the surface. In some circumstances, no external "setting" force need be applied when placed on a relatively horizontal surface. This is apparently due to the flexibility of the material, the mass of the object and the relatively small suction chamber volume in relation to the size of the device and object. By virtue of this property, motions that tend to increase the chamber volume are thwarted because of the positive annular seal formed between the device and the surface. However, motions that tend to decrease the chamber volume size are not opposed because the material of the device is such that it allows the device to flex outwardly when pressure in the chamber is increased, as occurs with exertion of pressure in the direction of the surface. Accordingly, the device with the inserted object, will tend to continually adhere to surfaces even where there are slow leaks out of the chamber, for example, in the case of a somewhat porous or rough surface.

The device may be used to secure an object to a non-horizontal surface when, after insertion of the object, an external "setting force" is exerted in the direction of the surface. The same physical characteristic described above enable the object to remain removably secured to the surface for a required period of time.

Typical objects with a cylindrical portion to their shape that can be reversibly attached using this simple ring-shaped embodiment are beverage containers (bottles, cans), food containers (bottles, cans), objects such as flashlights, substance containers (e.g., paint cans, spray cans, nail polish bottles, gas cylinders), plant containers, etc., Virtually any object that contains a cylindrical portion to its surface and center of gravity that enables it to be attached to a surface using this device is contemplated by this invention.

Figure 7:
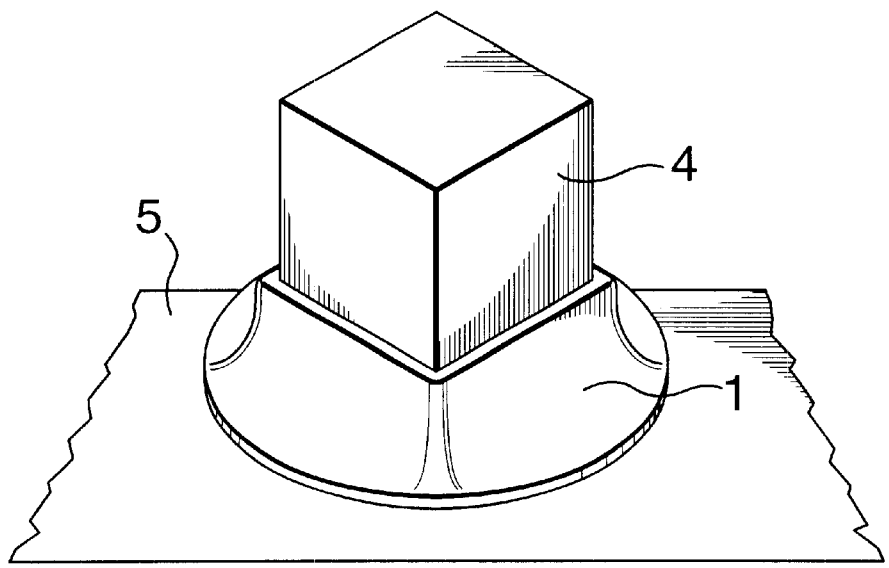
FIG. 7 demonstrates the use of one embodiment of the device with a box 36.

Objects with a non-cylindrical portion can also be reversibly attached using an embodiment of this invention, as demonstrated in FIG. 7. One skilled in the art would appreciate the manner in which the object-opening must be adapted for a non-cylindrical shaped object.

In general, the need would arise to reversibly attach objects to a surface particularly in situations such as in moving vehicles (cars, trains, buses, etc.), boats, or any circumstance where movement of the surface renders stability of an object difficult. The need can also arise in situations where the surface is stable, but the risk of knocking over a container is undesirable and likely. For example, when using paint, glue or other art materials, especially with children, it would be desirable to reversibly attach the container to the table to minimize the risk of knocking over the container. Another simple example arises with the use of nail polish containers, wherein it would be desirable to reversibly attach the container to a surface for the same reason.

Thus, it can be easily appreciated that the simplicity of the design of the apparatus renders it useful and adaptable to almost any conceivable situation wherein it is desirable to reversibly attach an object to a surface. It is obvious to a person skilled in the art that the suction device will not work properly if the object inserted into it allows a significant passage of air into the area where the partial vacuum should form. In addition, the size of the device material must correspond to the shape and the mass of the object, and the environmental conditions, to provide adequate vacuum pressure and resulting adequate level of attachment and stability.

Other preferred embodiments entail the overall shape of the device designed in shapes that are suggestive of different items such as: numbers; letters; punctuation symbols; scientific symbols; cultural images; religious images; political image; sports images; biological images; musical images; mechanical images; geographical images; engineering images; typographical images; iconic images; phonetic images, and mathematical images. Some examples are presented in FIGS. 9–11.

The design is generally a two-dimensional representation of the image, although a three-dimensional device can also be contemplated. For example, if it is desirable to fashion a device in the image of a mountain or a volcano that holds a bottle, the fabric can be shaped in the two-dimensional representation of a mountain with a hole in the center that holds the bottle, or it can be formed in a three-dimensional mountain shape such that the bottle fits in the mouth of the volcano wherein the object-opening in the fabric rises to the neck of the bottle.

Another embodiment of the present invention provides a suction device wherein an insulating sleeve is incorporated to envelope the inserted object; said sleeve may or may not be detachable from the device. An example of this type of embodiment is presented in FIG. 5.

Figure 8:
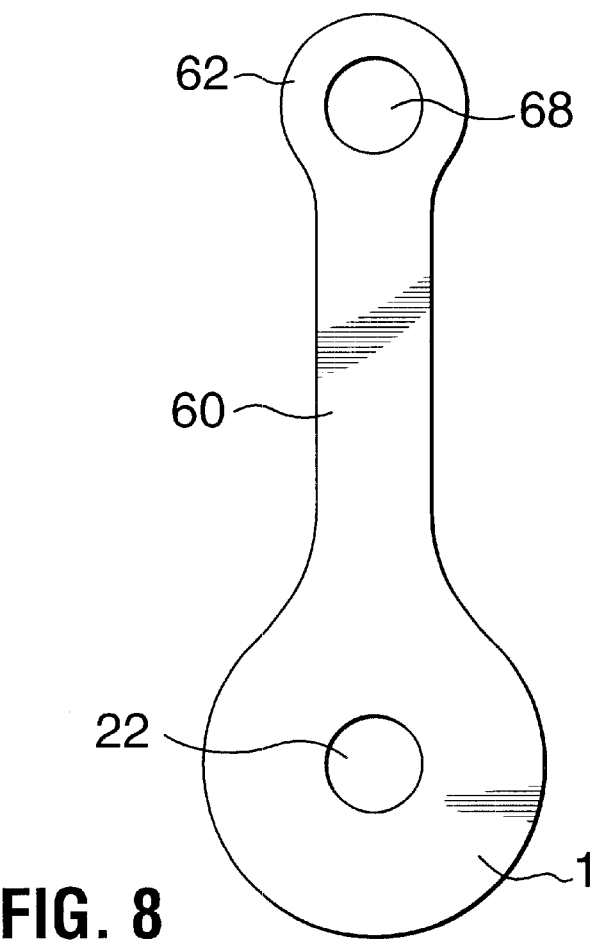
FIG. 8 presents a vertical frontal view of one handle embodiment of the device.
Figure 9:
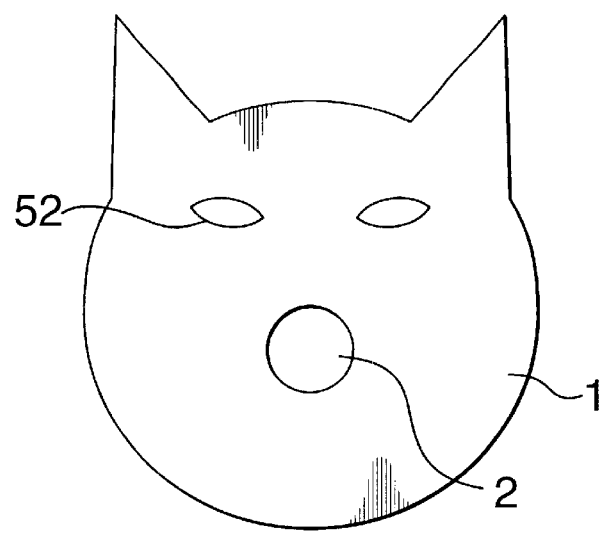
FIG. 9 portrays a vertical frontal view of one cat embodiment of the device where a decorative feature 52, in the shape of the cat's eyes, has been added.
Figure 10:
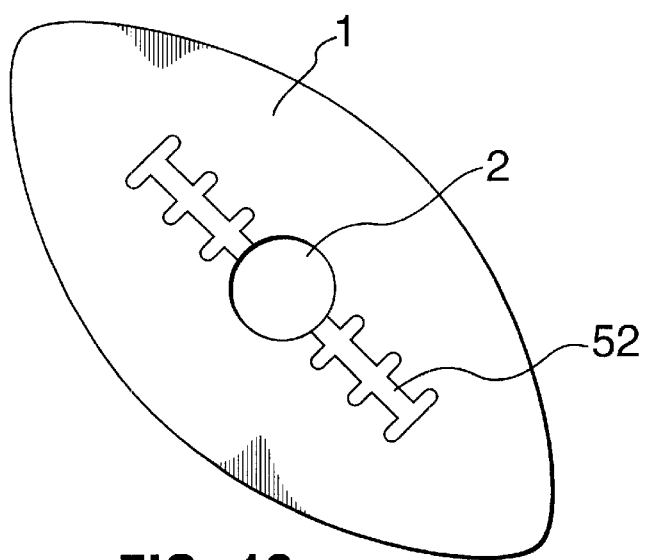
FIG. 10 illustrates a vertical frontal view of one football embodiment of the device where a decorative feature 52, representing the stitching on a football, has been added.
Figure 11:
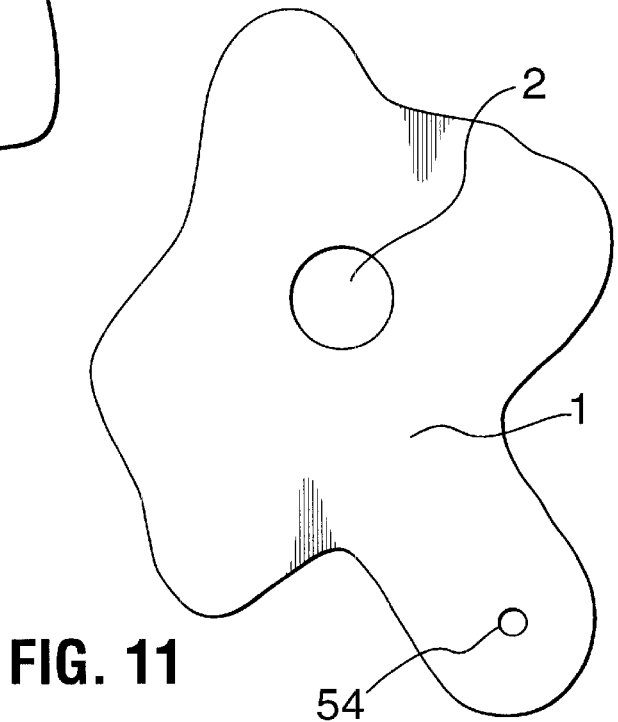
FIG. 11 displays a vertical frontal view of a golf hole embodiment of the device where the object hole 22 is representative of the golf tee, and there is a decorative hole 54 that is representative of a golf green.

FIG. 8 presents another embodiment wherein the material can loop back around to grasp the top of a container, such as a bottle, thereby forming a handle that can be used to remove the device and the object from the surface. Another embodiment of the present invention provides a suction device wherein the shape of the material incorporates a tab useful for grasping in order to release the seal and eliminate the vacuum.

Types of Materials

The device can be made from a variety of materials, the critical feature being that it is able to form a continuous seal with an object and with a surface material, such that the device is capable of forming a secure attachment with a variety of surfaces. Thus it must be manufactured a materials chosen to suit the attributes of the physical conditions of the surface. Materials which can be used for this purpose include, but are not limited to: neoprene; rubber; silicone; plastic; wax; cellulose; and acrylic. Where the material is neoprene, the preferred thickness of the material is from 2 mm to 4 mm.

In another embodiment of the present invention the device can include an absorbent fabric, wherein the absorbent fabric is in contact with the lower end of the object and acts to protect the attachment surface from condensation generated from the inserted object. This is useful when, for example, the inserted object is a beverage container.

In some embodiments, it may be desirable to fabricate the device from a material and then coat it with a substance that renders it fluorescent, luminescent, chemical resistant, non-static, etc.

Size and Shape of the Object Opening

The object-opening in the device can easily be scaled for use with a variety of objects, such as, but not limited to: beverage cans, boxes and bottles, coffee cups, flashlights, baby food jars, plant pots, nail polish bottles, and paint cans.

An object-opening can be in the form of a basic shape such as a square, a rectangle, a star, a triangle, an oval or a circle, or whatever shape best corresponds to the object to be reversibly anchored. Another embodiment of the present invention provides an object-opening comprising a plurality of intersecting insertion slits such that the shape of the device opening does not necessarily correspond to the shape of the perimeter of the inserted object but is capable of resiliently gripping the object as a result of the continuous seal which forms.

Figure 2:
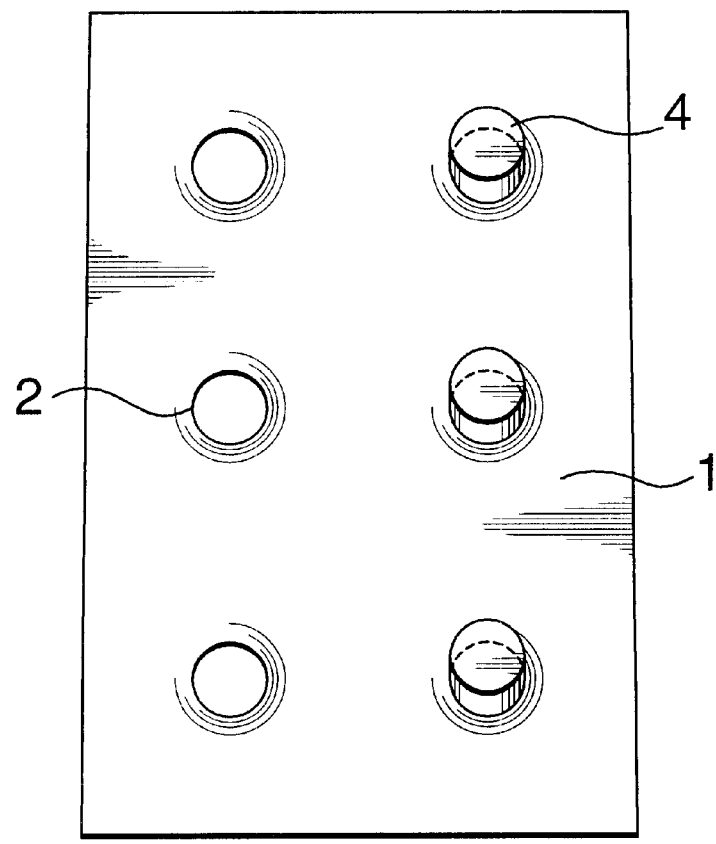
FIG. 2 illustrates the use of one embodiment of the device 1 wherein there is a plurality of object-openings 2. This embodiment can be used to secure multiple objects, close to one another, on a surface.

FIG. 2 presents another embodiment comprises multiple object-openings wherein it is desirable to reversibly anchor a number of objects such as collection tubes for an assay. For example, while performing an assay or collecting samples to be tested it is sometimes desirable to reversibly anchor a number of collection tubes, bottles, jars, etc. to a surface while performing a task such as sample collection. One skilled in the art would appreciate that the requirement for a vacuum necessitates that either all the object-holes remain filled for the period of time in which the objects need to be anchored to the surface if removal of one object causes the device to become unattached, or the device be so designed that sufficient seal remains around that empty object-hole(s) that the object(s) in the device remain anchored to the surface. Such an embodiment would find use, for example, in such a situation as for blood collection or a surgical setting in a hospital.

Utility of the Device

It is an object of the present invention to provide a device for removably securing objects that can secure a wide variety of objects, that is, a device for removably securing objects that is neither object specific, nor permanently attached to one object, wherein the vacuum generated by pressing the object-filled device to a surface is of a pressure sufficient to secure objects of various shapes, and masses.

The device can be used in any instance where there is an increased possibility that an object may tip or fall over, such as bath tub surfaces, swimming pool decks, outdoor deck or balcony railings, serving trays or platters. The device is also useful as a safety device for securing objects, such as glass objects, which may break and produce potentially injurious material if they were to fall. In another embodiment the device can-be used for removably securing objects containing potentially harmful material out of reach of children, for example, cleaning solutions, solvents, therapeutic drugs and vitamins.

In an embodiment the device is designed for use in securing beverage containers to moving attachment surfaces, such as exercise equipment, boats, and cars.

In another embodiment the device is designed for industrial uses such as securing paint cans, refuse containers, gas cans, and for securing machinery. With such uses the area of the material of the device must correspond with the size, shape and mass of the object to be secured. Large machines require a large amount of material whereas small paint cans do not. Areas of up to 100 m$^2$ and larger are envisioned. It is envisioned that openings in such a large piece of material could correspond to objects with perimeters up to 10 m. Areas down to 1 cm$^2$ can be used for smaller objects such as surgical devices, in which the opening could compensate an object with a perimeter as small as 0.1 cm. The material of the device of the present invention can also vary in thickness to further accommodate objects of various sizes. It is envisioned that the thickness may range from 1 $\mu$m to 15 cm.

In another embodiment the device is designed for use with test kits, such as for removably securing samples of water or samples of blood in carrying means. These test kits could optionally include objects to be anchored and instructions for use.

The various embodiments of the present invention are adapted to carry indicia on the upper surface, such as advertising and promotional messages, calendars, design features, warnings relating to the inserted object, or instructions for use. An option is to mark the upper surface of the device of the present invention with a guide line and/or instructions to indicate the location of the proper position for the object to be inserted into the device.

Advantages of the Device

Another embodiment of the present invention provides a device for securing objects with the option of additional stability by incorporating functional features that allow the object to be secured by the object being placed in and through the device, rather than having the object attached to the top of the device.

To gain a better understanding of the invention described herein, the following examples are set forth. It should be understood that these examples are for illustrative purposes only. Therefore, they should not limit the scope of this invention in any way.

EXAMPLES

Example I

Reversible Attachment of Beverage Containers

Figure 3:
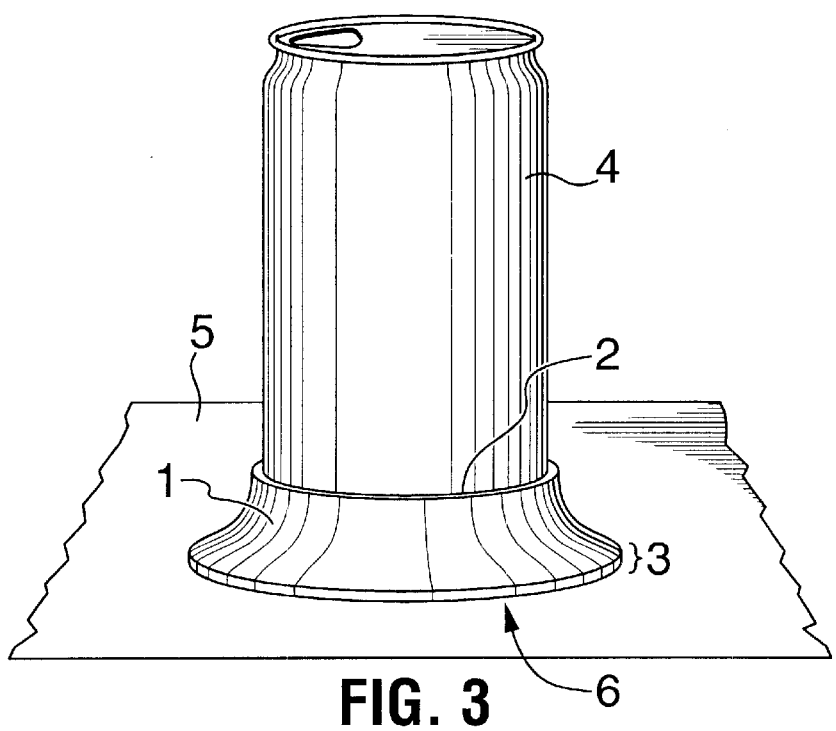
FIG. 3 demonstrates the use of one embodiment of the device with a can.

One example of the utility of the device 1 is its interaction with an object 4 which is a beverage container to reversibly attach the beverage can to a surface 5, as illustrated in FIG. 3. An object 4 (e.g. beverage can), is inserted through the object hole 2 in the device 1, which fits tightly around the can such that the object-hole 2 of the device forms a seal with the object 4.

When the device is pressed against a surface 5, such as a vehicle dashboard, the flexible lip 3 of the device forms a continuous seal with the surface, such that a vacuum is created between the lower edge of the device 6 and the surface 5, thereby securing the object 4 to the surface 5.

Example II

Reversible Attachment of Objects Such as Flashlights

Figure 4:
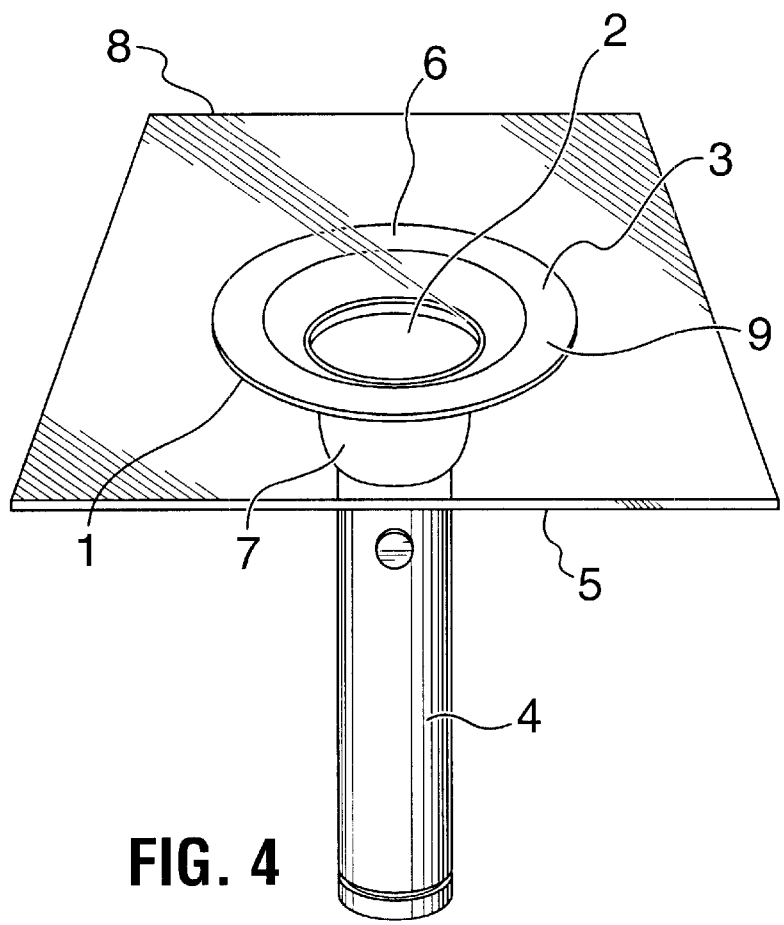
FIG. 4 demonstrates the use of one embodiment of the device with a flashlight.

The device 1 can be used to interact with an object 4, such as a flashlight as illustrated in FIG. 4. The head of the flashlight 7, is engaged into the object hole 2, of the device 1, such that the device clasps tightly and forms a flexible lip 3, around the flashlight head 7. When the flashlight/device combination is pressed against a surface 5 such as a window pane 8, the lip 3 of the device 1 forms a continuous seal with the surface 5 of the window pane, along the device-surface interface 6, such that a vacuum is created between the lip 3 and the surface of the window pane 5, thereby securing the flashlight to the window.

Example III

The Device with an Optional Insulating Sleeve

Figure 5:
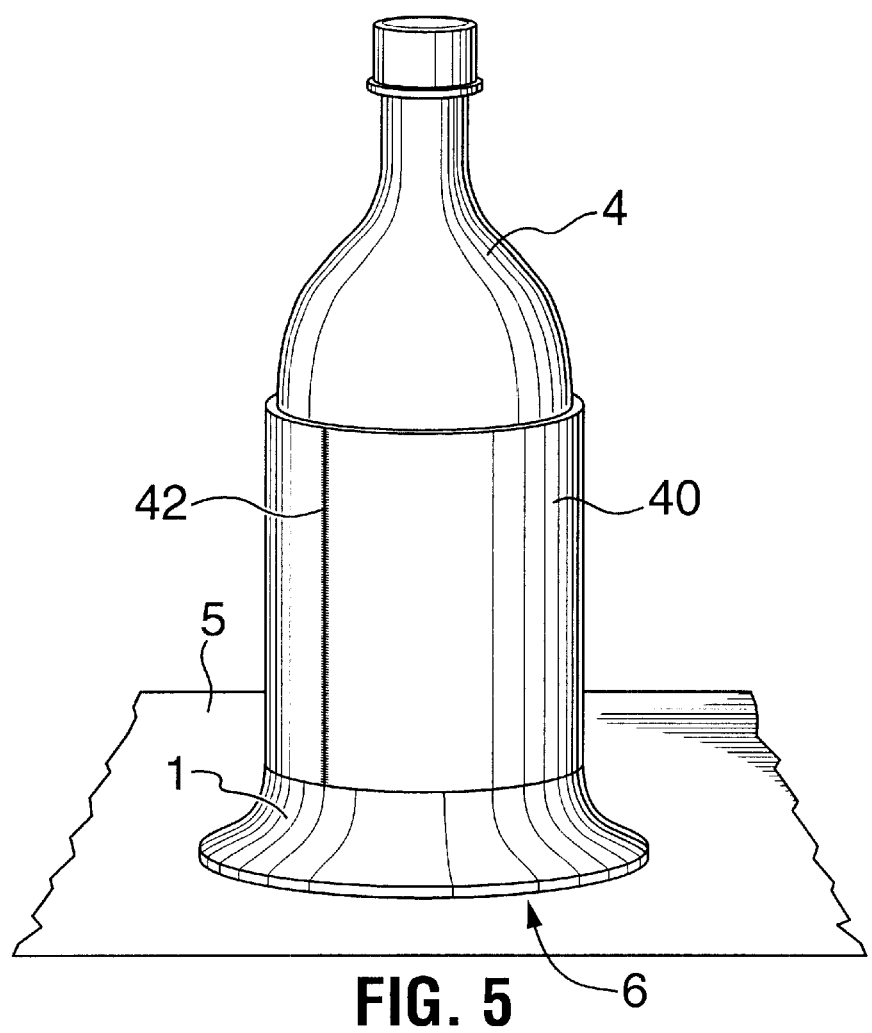
FIG. 5 demonstrates the use of one insulating sleeve embodiment of the device.

In FIG. 5 demonstrates the use of an insulating sleeve embodiment of the device, wherein an object 4 (such as a bottle) has been inserted through the object hole up into the insulating sleeve 40. In this figure the seam in the insulating sleeve 42 is visible. Once inserted into the sleeve, the device 1, containing the object 4 (bottle), is pressed against an attachment surface 5. This results in the creation of a vacuum between the device and the attachment surface, and the bottle is effectively attached to the surface.

Example IV

The Device with an Optional Rigid Container Holder

Figure 6:
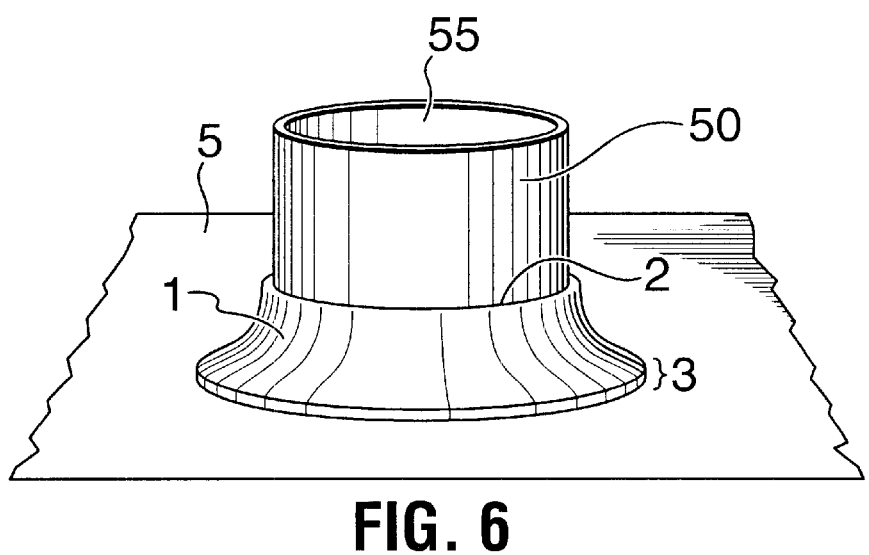
FIG. 6 shows a horizontal view of one rigid cup holder embodiment of the device.

In FIG. 6, which shows a horizontal view of an embodiment of the device comprising an optional rigid container holder. A rigid cup holder (exterior view) 50 is inserted into the device 1, such that a seal forms between the exterior surface of the rigid cup holder 50 and the object-hole of the device 2. The device is then pressed against a surface 5 such that the flexible lip 3 forms a seal with the surface 5 and creates a vacuum. Once the device and attached rigid cup holder are securely attached to the surface, a beverage container can be inserted into the rigid cup holder (interior view) 55.

Example V

An Embodiment of the Device

FIG. 7 presents an embodiment of the device wherein the object to be secured is in the form of a block, for example a square or rectangular box. This embodiment demonstrates that the device is not limited to use with objects with a cylindrical perimeter.

Example VI

The Device with an Optional Handle

FIG. 8, which presents a vertical frontal view of one handle embodiment of the device, shows a basic embodiment of the device 1, containing one object hole, with additional material, in the shape of a device handle 60, extending out and ending in another portion of the material containing a top object hole 68. An object, such as a bottle, is inserted into the portion of the device containing the larger piece of material, the attachment end 60. This forms a flexible lip. The handle end 62 of the device, containing the top object hole is then, pulled over the top portion of the object, for example, a bottle. This forms a handle. The flexible lip on the attachment end of the device is then pressed against an attachment surface creating a seal and a resulting vacuum. To break the seal, and eliminate the vacuum, the device and object can be picked up by the handle which allows air to enter the space between the device and the attachment surface.

Example VII

Object Rack Embodiment

FIG. 2 demonstrates one utility of the device wherein the material has a plurality of object-openings that may be used for securing multiple objects simultaneously and proximal to one another. In this embodiment the device may be use to secure a single object or multiple objects to a surface, since it is not necessary for all of the object-openings to be filled. Each object-opening acts to resiliently grip an object and allow it to be removably secured to a surface without being affected by the remaining object-openings of the device.

It is to be understood that the foregoing description and appended drawings are for illustrative purposes only and are neither intended nor desired to limit the scope of this invention. Having thus described the various embodiments of the invention, what is claimed as new and novel and desired to be protected is as follows.

I claim:

1. A device for removably securing objects comprising:
   (a) a flexible material having a top and a bottom,
   (b) one or more opening(s) through said material and extending from the top to the bottom, each of said openings having a cross section, each cross section being substantially uniform from the top to the bottom, whereby said opening is capable of forming a continuous seal with a portion of an object, said flexible material is able to form a continuous seal with a surface capable of forming a partial vacuum, and said opening is positioned within the boundaries of said material whereby sufficient material remains surrounding said opening to enable a continuous seal to be formed with said surface when:
      (1) an object is inserted into said opening forming a seal between the object and the opening; and
      (2) said device is pressed against said surface in a manner that causes a continuous seal to form between the flexible material and said surface, in a manner that displaces air to create a partial vacuum, thereby removably securing said object to said surface.

2. A device as in claim 1 wherein the said material has the ability to stretch.

3. A device as in claim 1 wherein the said material is selected from the group consisting of: neoprene; rubber; silicone; plastic; wax; cellulose; or acrylic.

4. A device as in claim 1 wherein said material is coated with a substance selected from the group comprising: neoprene; rubber; silicone; plastic; wax; cellulose; and acrylic.

5. A device as in claim 1 wherein the shape of said device is representative of an image selected from the group comprising: geometric shapes; the shapes of numbers; the shapes of letters; the shapes of punctuation symbols; the shapes of scientific symbols; cultural shapes; religious shapes; political shapes; sports shapes; biological shapes; musical shapes; mechanical shapes; geographical shapes; engineering shapes; typographical shapes; iconic shapes; phonetic shapes, and mathematical shapes.

6. A device as in claim 1 wherein the shape of said opening is representative of an image selected from the group comprising: geometric shapes; the shapes of numbers; the shapes of letters; the shapes of punctuation symbols; the shapes of scientific symbols; cultural shapes; religious shapes; political shapes; sports shapes; biological shapes; musical shapes; mechanical shapes; geographical shapes; engineering shapes; typographical shapes; iconic shapes; phonetic shapes; and mathematical shapes.

7. A device as in claim 1 wherein the area of said material ranges from 1 cm$^2$ to 100 m$^2$.

8. A device as in claim 1 wherein the opening in said material can correspond to objects with a perimeter ranging from 0.1 cm to 10 m.

9. A device as in claim 1 wherein the thickness of said material ranges from 1 $\mu$m to 15 cm.

10. A device as in claim 1 wherein the device is anchored to one or more flashlights and a surface.

11. A device as in claim 1 wherein the device is anchored to one or more cans and a surface.

12. A device as in claim 1 wherein the device is anchored to one or more bottles and a surface.

13. A device as in claim 1 wherein the device is anchored to one or more plastic containers and a surface.

14. A device as in claim 1 wherein the device is anchored to one or more mugs and a surface.

15. A device as in claim 1 wherein the device is anchored to one or more cups and a surface.

16. A kit for anchoring one or more objects to a surface comprising a device of claim 1, and optionally including:

(a) objects to be anchored;

(b) instructions for use.

17. A device as in claim 1 wherein the device is attached to one or more sleeves.

18. A device as in claim 17 wherein the one or more sleeves are insulating sleeves.

19. A device as in claim 17, wherein the device is permanently attached to said one or more sleeves.

20. A device as in claim 19 wherein the one or more sleeves are insulating sleeves.

21. A device as in claim 17, wherein the device is detachable from said one or more sleeves.

22. A device as in claim 21 wherein the one or more sleeves are insulating sleeves.

23. A method of anchoring one or more objects to a surface comprising inserting an object into an opening of a device according to claim 1, thereby anchoring the one or more objects to the surface.

* * * * *